US009638519B2

(12) United States Patent
Kwiatkowski et al.

(10) Patent No.: US 9,638,519 B2
(45) Date of Patent: May 2, 2017

(54) METHOD FOR DETERMINING A CHANGE IN DISTANCE TO A MOVABLE AND REFLECTIVE TARGET BY MEANS OF INTERFEROMETER TO DETERMINE IF THE MOVEMENT OF THE REFLECTIVE TARGET IS REALLY EXECUTABLE

(71) Applicant: LEICA GEOSYSTEMS AG, Heerbrugg (CH)

(72) Inventors: Tomasz Kwiatkowski, Moosleerau (CH); Thomas Lüthi, Aarau (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 14/382,264

(22) PCT Filed: Feb. 28, 2013

(86) PCT No.: PCT/EP2013/054009
§ 371 (c)(1),
(2) Date: Aug. 29, 2014

(87) PCT Pub. No.: WO2013/127908
PCT Pub. Date: Sep. 6, 2013

(65) Prior Publication Data

US 2015/0043007 A1 Feb. 12, 2015

(30) Foreign Application Priority Data

Mar. 1, 2012 (EP) .................................... 12157806

(51) Int. Cl.
*G01C 1/04* (2006.01)
*G01S 7/48* (2006.01)
(Continued)

(52) U.S. Cl.
CPC ................ *G01C 1/04* (2013.01); *G01B 9/02* (2013.01); *G01B 11/14* (2013.01); *G01S 7/48* (2013.01)

(58) Field of Classification Search
CPC ...... G01S 57/48; G01S 57/4808; G01S 17/66; G01S 17/42; G01S 17/89; G01B 11/14; G01B 11/26; G01C 1/02; G01C 1/04
See application file for complete search history.

(56) References Cited

U.S. PATENT DOCUMENTS 5,587,785 A * 12/1996 Kato ...................... G01P 3/366 356/28
6,062,216 A 5/2000 Corn
(Continued)

FOREIGN PATENT DOCUMENTS

CN 101189532 A 5/2008
DE 41 14 786 A1 11/1992
(Continued)

OTHER PUBLICATIONS

European Search Report dated Jul. 3, 2012 as received in Application No. EP 12 15 7806.

*Primary Examiner* — Michael P Lapage
(74) *Attorney, Agent, or Firm* — Maschoff Brennan

(57) ABSTRACT

Embodiments of the invention relate to a method for determining a change in distance to a moving and reflective target. Embodiments of the invention can be performed by means of interferometry and may include the generation of laser radiation, the emission of the measurement radiation to the target, and the detection of at least part of the measurement radiation reflected at the target. In some embodiments, a superposition of the reflected measurement radiation with the reference radiation is generated and detected, an interferometer output variable is derived on the basis of the detected superposition, and/or a time-resolved output variable
(Continued)

able curve is produced from the derived interferometer output variable. In some embodiments, the output variable curve is continually checked in that the output variable curve is continually read out in a time-resolved manner.

19 Claims, 4 Drawing Sheets

(51) Int. Cl.
*G01B 9/02* (2006.01)
*G01B 11/14* (2006.01)

(56) References Cited

U.S. PATENT DOCUMENTS 7,474,388 B2 1/2009 Ohtomo et al.
8,031,331 B2 10/2011 Meier et al.
8,772,719 B2 7/2014 Böckem et al.
2003/0206285 A1* 11/2003 Lau ........................ B25J 9/1692 356/4.09
2008/0314155 A1* 12/2008 Blackmon ................ G01H 5/00 73/649
2009/0299197 A1* 12/2009 Antonelli ............... A61B 5/021 600/485
2010/0315653 A1 12/2010 Weingartz et al.
2012/0239194 A1* 9/2012 Kagawa ................. B25J 9/1692 700/254

FOREIGN PATENT DOCUMENTS

| | | | |
|---|---|---|---|
| DE | 10 2007 029 299 | A1 | 1/2009 |
| EP | 0 553 266 | B1 | 5/1997 |
| EP | 2 602 641 | B1 | 2/2014 |
| JP | 04-013905 | A | 1/1992 |
| JP | 07-128349 | A | 5/1995 |
| JP | 07-253303 | A | 10/1995 |
| JP | 11-037807 | A | 2/1999 |
| JP | 2010-008061 | A | 1/2010 |
| WO | 89/06781 | A1 | 7/1989 |
| WO | 03/062744 | A1 | 7/2003 |
| WO | 2007/079600 | A1 | 7/2007 |
| WO | 2010/148525 | A1 | 12/2010 |

* cited by examiner 10
20
30
40
41
11
15
16
17
21
80
81
82
83

METHOD FOR DETERMINING A CHANGE IN DISTANCE TO A MOVABLE AND REFLECTIVE TARGET BY MEANS OF INTERFEROMETER TO DETERMINE IF THE MOVEMENT OF THE REFLECTIVE TARGET IS REALLY EXECUTABLE

FIELD OF THE INVENTION

The invention relates to a method for determining a distance change to a movable and reflective target and a measuring device for executing the method.

BACKGROUND

Measuring devices which are implemented for progressive tracking of a target point and a coordinate position determination of this point can generally, in particular in conjunction with industrial surveying, be summarized under the term laser trackers. A target point can be represented in this case by a retroreflective unit (for example, a cube prism), which is targeted using an optical measurement beam of the measuring device, in particular a laser beam. The laser beam is reflected in parallel back to the measuring device, wherein the reflected beam is detected using a detection unit of the device. An emission or reception direction of the beam is ascertained in this case, for example, by means of sensors for angle measurement, which are associated with a deflection mirror or a targeting unit of the system. In addition, a distance from the measuring device to the target point is ascertained with the detection of the beam, for example, by means of runtime or phase difference measurement.

Laser trackers according to the prior art can additionally be embodied having an optical image detection unit having a two-dimensional, light-sensitive array, for example, a CCD or CID camera or a camera based on a CMOS array, or having a pixel array sensor and having an image processing unit. The laser tracker and the camera can be installed one on top of another in this case in particular in such a manner that the positions thereof in relation to one another are not variable. The camera is, for example, rotatable together with the laser tracker about its essentially perpendicular axis, but is pivotable up-and-down independently of the laser tracker and is therefore arranged separately from the optic of the laser beam in particular. Furthermore, the camera—for example, as a function of the respective application—can be embodied as pivotable about only one axis. In alternative embodiments, the camera can be installed in an integrated construction together with the laser optic in a shared housing.

With the detection and analysis of an image—by means of an image detection and image processing unit—of a so-called measuring aid instrument having markings, the relative locations of which to one another are known, an orientation of the instrument and of an object (for example, a probe), which is arranged on the measuring aid instrument, in space can be concluded. Together with the determined spatial position of the target point, furthermore the position and orientation of the object in space can be precisely determined absolutely and/or in relation to the laser tracker.

Such measuring aid instruments can be embodied by so-called scanning tools, which are positioned having the contact point thereof on a point of the target object. The scanning tool has markings, for example, light spots, and a reflector, which represents a target point on the scanning tool and can be targeted using the laser beam of the tracker, wherein the positions of the markings and of the reflector in relation to the contact point of the scanning tool are precisely known. The measuring aid instrument can also be, in a way known to a person skilled in the art, a handheld scanner equipped for distance measurement, for example, for contactless surface surveying, wherein the direction and position of the scanner measurement beam used for the distance measurement are precisely known in relation to the light spots and reflectors which are arranged on the scanner. Such a scanner is described, for example, in EP 0 553 266.

In addition, in modern tracker systems, a deviation of the received measurement beam from a zero position is ascertained on a sensor—increasingly as a standard feature. By means of this measurable deviation, a position difference between the center of a retroreflector and the point of incidence of the laser beam on the reflector can be determined and the alignment of the laser beam can be corrected or tracked as a function of this deviation such that the deviation on the sensor is decreased, in particular is "zero", and therefore the beam is aligned in the direction of the reflector center. By way of the tracking of the laser beam alignment, progressive target tracking (tracking) of the target point can be performed and the distance and position of the target point can be progressively determined in relation to the measuring device. The tracking can be implemented in this case by means of an alignment change of the deflection mirror, which is movable by a motor, provided for deflecting the laser beam and/or by pivoting the targeting unit, which has the beam-guiding laser optic.

The described target tracking must be preceded by locking of the laser beam on the reflector. For this purpose, a detection unit having a position-sensitive sensor and having a comparatively large field of vision can additionally be arranged on the tracker. In addition, in devices of this type, additional illumination means are integrated, using which the target or the reflector is illuminated, in particular using a defined wavelength differing from the wavelength of the distance measuring means. The sensor can be implemented in this context as sensitive to a range around this specific wavelength, for example, to reduce or entirely prevent external light influences. By means of the illumination means, the target can be illuminated and, using the camera, an image of the target having an illuminated reflector can be detected. By way of the imaging of the specific (wavelength-specific) reflection on the sensor, the reflection position in the image can be resolved and therefore an angle in relation to the detection direction of the camera and a direction to the target or reflector can be determined. An embodiment of a laser tracker having such a target search unit is known, for example, from WO 2010/148525 A1. In dependence on the direction information thus derivable, the alignment of the measurement laser beam can be changed such that a distance between the laser beam and the reflector onto which the laser beam is to be locked is decreased.

Laser trackers of the prior art have at least one distance meter for distance measurement, wherein it can be implemented as an interferometer, for example. Since such distance measuring units can only measure relative distance changes, so-called absolute distance meters are installed in addition to interferometers in current laser trackers. For example, such a combination of measuring means for distance determination is known by way of the product AT901 of Leica Geosystems AG. The interferometers used in this context for distance measurement primarily use gas lasers—as a result of the long coherence length and the measurement range thus made possible—as light sources, in particular HeNe gas lasers. The coherence length of the HeNe laser can be several hundred meters, so that the ranges required in industrial metrology can be achieved using relatively simple interferometer constructions. A combination of an absolute distance meter and an interferometer for distance determination using a HeNe laser is known, for example, from WO 2007/079600 A1.

By way of the use of such an interferometer for distance determination or determination of the distance change in a laser tracker, a very high measurement precision can be implemented as a result of the interferometric measuring method thus usable.

However, this advantageous measurement precision is disadvantageously opposed by the robustness and reliability of the interferometer measurement to be executed. To execute a correct measurement of the distance change, in particular a progressively correct measurement during tracking of a target, by means of the interferometer, detection, which is continuous during the measurement, and correct readout of the interferometer pulses generated by interference effects (intensity maxima and minima) must be ensured. The determination of the distance change is dependent in this case on the number of the detected interferometer pulses. Uninterrupted reception and recognition of the interferometer pulses can be interfered with, in particular in the event of a large distance between the interferometer and the target, since the measurement radiation reflected from the target in this case is detected with comparatively low intensity and the available sensitivity of the interferometer detector is not sufficient to clearly detect the pulses. Due to a loss thus caused of one or more interferometer pulses during the detection, the determination of the distance change dependent thereon can be erroneous. An erroneous detection of the pulses (one or more pulses are not counted) can additionally be caused by a rapid offset of the reflective target and an intensity fluctuation or intensity reduction thus generated at the interferometer detector. This can occur in particular during tracking of a target, if the movement of the reflector occurs more rapidly than a servo-controlled tracking of the laser radiation to the target can be carried out. Since the determinable distance change is dependent on the number of recognized pulses, an erroneous distance measured value can thus be generated.

A further disadvantageous aspect in this context is that in the case of an above-described erroneous measurement, a measured value can be generated, but a user of the system does not recognize this measurement error or cannot recognize it, as a result of the achievable measurement resolution, and assumes the generated measured value to be correct. Individual incorrect measurements can accumulate due to repeated such non-consideration of the error and a resulting (total) measurement error can therefore be enlarged.

SUMMARY

Some embodiments of the present invention provide a function for a measuring device, in particular a laser tracker, in the scope of which an interferometric measurement is checked, in particular progressively, for its correctness.

Some embodiments of the present invention provide a checking functionality for a determination of a distance change, in particular for a measuring device, in particular a laser tracker, such that a possible measurement error is recognized and a corresponding item of information is output if a measurement error is present.

Some embodiments of the invention provide a laser tracker, using which a check of a measurement, which is executable using an interferometer to determine a distance change, can be carried out with respect to the correctness thereof.

Some embodiments of the invention provide an automated functionality for correcting measured values identified as erroneous.

The invention relates to a method for determining a distance change to a movable and reflective target by means of interferometry, having an emission of measurement radiation to the target, a reception of at least a part of the measurement radiation, which is reflected on the target, and a generation and detection of a superposition of the reflected measurement radiation with a reference radiation. In addition, a derivation of an interferometer output variable based at least on the detected superposition, wherein the interferometer output variable is dependent on a distance to the target, a generation of a time-resolved output variable curve from the derived interferometer output variable, and an ascertainment of the distance change based on the output variable curve are performed.

Furthermore, a progressive checking of the output variable curve is performed in that, based on the output variable curve, at least one movement parameter, which relates to the direction of the measurement radiation, of a relative movement of the target is progressively derived, a progressive comparison of the movement parameter to a defined movement criterion of the target is performed, wherein the movement criterion specifies a relative movement of the target in the direction of the measurement radiation, which relative movement is assumed to be really executable, practically plausible, and empirical, and an item of information is provided if the movement criterion is not fulfilled.

In the scope of the method according to the invention, an automated judgment can therefore be carried out of an interferometric measurement, which was carried out, with respect to its correctness. After the check of whether a movement of the target or of an interferometric measuring device, which is derivable from the interferometer data, corresponds to a movement which can actually be executed under prevailing physical conditions and optionally in the scope of the present measurement arrangement (for example, with obstructions in a measurement space which make a specific movement impossible), the item of information, i.e., an item of information which particularly provides a user with an explanation of whether or with what probability the measurement is erroneous, can be, for example, graphically displayed on a display screen or output by means of an acoustic signal.

In particular, by way of a specification by the movement criterion for a movement which can be carried out in the scope of actually applicable physical conditions, inverse conditions for impossible relative movements, which, for example, would infringe applicable physical laws (for example, inertia), can also be defined. In general, the movement criterion specifies a scope, within which a relative movement determined by means of an interferometric measurement could potentially actually be carried out or not carried out. Therefore, a decision can be made on the basis of this criterion of whether a measured movement is to be rejected or accepted.

In general, in the scope of this invention, the interferometer output variable is to be understood as a variable which is provided by an interferometer or is output thereby and from which a distance change to a target is derivable by a progressive detection of this variable as an output variable curve.

For homodyne interferometers, the interferometer output variable is to be understood as an interference state dependent on a distance to the target (constructive or destructive interference) and the output variable curve is to be understood as the interference curve, generated by a progressive detection of the interference state.

For heterodyne interferometers, the interferometer output variable is to be understood as a comparison of a phase relation between a measurement superposition (beat generated by bringing together measurement radiation and a reference beam having different wavelengths) at a measurement detector and a reference variable or a beat at a reference detector (reference superposition). The reference variable can be electronically generated in this case, for example, by a modulation frequency of an acousto-optical modulator for modulating at least one of the radiations (measurement radiation and/or reference radiation). The output variable curve is to be understood for a heterodyne interferometer as a time-resolved, progressively detected comparison (phase difference) of the measurement superposition with the reference variable or with the reference superposition.

In particular, further embodiments of interferometers can be known to a person skilled in the art, wherein for such an embodiment, the interferometer output variable is the variable, by which a distance change can be detected by means of a progressive detection of this variable (output variable curve).

A relative movement of the target can be evaluated with respect to a really executable movement for these different embodiments of interferometers by way of the progressive checking of the output variable curve according to the invention.

The output variable curve can be imaged or resolved in the meaning of the invention in dependence on a sampling rate, for example, i.e., a defined, in particular settable number of measurements can be carried out in a determined time interval.

In addition, the output variable curve can be embodied solely by a number of pulses measured in a time interval (defined by a sequence of constructive interference and destructive interference) having a respective item of time information, wherein this number can correspond to a number of occurring overshoots of a threshold value. I.e., for this purpose, for example, a signal representing the detected interferometer output variable can be progressively detected, wherein a threshold value for this signal is additionally defined and every overshoot of the threshold value (and the following drop of the signal level below the threshold value) is counted as a pulse. By way of the additional item of time information, a sequence of pulses in a defined time interval can be determined therefrom and used as a movement parameter.

A relative movement in the direction of the measurement radiation, i.e., in particular between a target and an interferometer, in particular the laser tracker, is generally to be understood in the context of the present invention as an at least radial movement along an optical axis, which is defined by the emitted measurement radiation, in particular since a change of a distance must occur between two objects (target and measuring device) for an interferometrically measurable relative movement.

In regard to the determination of a distance change between and the target, in the scope of the ascertainment of the distance change, interferometer pulses can be identified and progressively counted from a sequence of constructive interference and destructive interference, in particular intensity maxima and intensity minima, in particular wherein the distance change to the target is determined from a number of interferometer pulses determined in a defined time interval.

From the number of pulses and the known wavelength of the measurement radiation to be considered in this case, a very precise determination of the distance change can be carried out. Since the change of the measured distance is dependent on the number of the detected pulses, in the scope of the (checking) method according to the invention, those measurements, in the case of which e.g. a pulse was not counted or is "lost", are identified as erroneous. This is performed by an above-described comparison of movement parameter and movement criterion, wherein if a pulse is missing, a relative movement derived from the output variable curve (in which the pulse is also missing and therefore a movement is determined which appears impossible) is rejected.

According to the invention, a correction of the ascertained distance change can be carried out and/or a graphic or acoustic output of the item of information can be performed in dependence on the provision of the item of information. In this case, an adaptation of measurements which were carried out is implementable in the scope of the method according to the invention. The correction can be performed for this purpose such that a movement parameter derivable after the correction fulfills the movement criterion, in particular wherein an adaptation of the output variable curve is performed such that the movement parameter derived from the adapted output variable curve fulfills the movement criterion.

Therefore, in the scope of the invention, in addition to a measurement of the distance change, a generated measurement result can also be checked and, if an erroneous measurement is established, an active intervention can be taken and the measurement parameters or the output variable curve can be changed. By way of such a change, the movement parameter can be adapted so that in the event of a comparison to the movement criterion, a fulfillment of the criterion by the parameter is established. For example, an interference state identified as missing can be modeled and incorporated for this purpose, so that the output variable curve derivable therefrom describes a movement of the target which can be carried out. In particular, in this context, a pulse sequence (multiple coherent pulses) can be simulated by means of a Kalman filter, for example, and incorporated in the output variable curve. A filtering method having predictors can especially be used in the scope of a calculation of such a pulse sequence.

In particular, an erroneous measurement can be caused by at least one pulse (multiple pulses), which were (incorrectly) detected in excess. In this case, alternatively to incorporating an additional pulse, an elimination of the erroneously detected pulse can be performed, so that the corrected output variable curve which is then derivable describes a relative movement of the target which can be carried out.

With respect to the movement parameter, which represents, for example, a variable for the relative movement in the direction of the measurement radiation, it can be derived in the scope of the method according to the invention such that a current relative velocity and/or current relative acceleration of the target in the direction of the measurement radiation is derived as a movement parameter from the output variable curve (which is read out in a time-resolved manner).

A parameter can thus be progressively generated, which specifies a present velocity or acceleration of a measuring device or of the target—the respective velocity or acceleration can also result from a simultaneous movement of the target and the measuring device—on the basis of the interference appearances detected at a detector of an interferometer. The movement parameter can describe in particular further movement-imaging variables such as, for example, the direction of the distance change (positive or negative), for the target.

Furthermore, to describe the interferometrically derivable target movement, according to the invention, an intensity curve, which is time-resolved in particular, can be derived in dependence on the output variable curve, in particular wherein the movement parameter is derived from an amplitude and/or a frequency of the intensity curve.

For example, a value for the amplitude or the frequency of the progressively detected intensity change can be used as a parameter and the movement criterion can be defined such that the amplitude value or frequency value is compared to an amplitude threshold value or frequency threshold value and the item of information is generated in dependence on exceeding this threshold. Such a threshold value can be defined in particular in dependence on a sensitivity of the interferometer detector. Furthermore, a signal level of an incoming signal, in particular of the interferometer output variable or the output variable curve, can be progressively detected and this level can be used as a movement parameter. A comparison to a predefined signal level movement criterion can be performed in this case in a similar manner to the above-described evaluation of the amplitude.

With regard to noise and/or variation of a signal detectable using an interferometer, whereby detected frequency variations can be caused, especially an accumulation of measured values over a defined time interval can be effected to average the detected signals. For example, a progressive average value for the frequency (or the amplitude) can be determined and the robustness of the system can thus be increased in relation to signal noise and signal variations.

In particular, according to the invention, the movement parameter can be determined as a frequency change and/or amplitude change from the intensity curve.

For example, a velocity change of the relative movement can be concluded from a frequency change. In addition, a frequency change behaves proportionally to a relative acceleration, whereby the relative acceleration of the target is determinable using the determination of the frequency change and can be taken into consideration for the derivation of the movement parameter.

With respect to the aspect of the definition of the movement criterion, in the scope of the invention, a tolerance range can be determined for the movement parameter and the tolerance range can be defined as the movement criterion, in particular wherein the tolerance range is defined by at least one threshold value.

Therefore, tolerances corresponding to individual movement parameters to be checked may be defined, wherein as a function of a comparison of the determined parameter to the respective tolerance or to threshold values defined for this purpose, an interferometer measurement can be evaluated as plausible (movement parameter inside the tolerances) or improbable or impossible (movement parameter outside the tolerances).

A further aspect of the invention relates to the determination of the movement criterion, wherein a real relative velocity, which is assumed to be maximal, and/or a real relative acceleration, which is assumed to be maximal, of the target in the direction of the measurement radiation is used as a movement criterion, in particular wherein the real relative velocity and/or the real relative acceleration are progressively measured and progressively set as a movement criterion.

Using such a consideration of maximal (conceivable or assumable) velocity and/or acceleration values or an actual movement of the target, a comparison of this assumed or actually determined movement to the movement which is derived by interferometry from the output variable curve can occur progressively.

The movement criterion can especially be determined according to the invention in dependence on a frequency difference between the reference radiation and the reflected measurement radiation. In this way, for example, on the foundation of the Doppler effect, a current (actual) velocity and/or acceleration of the target can be determined and this can be compared to a movement derived from the output variable curve.

Another aspect of the invention relates to the properties of the laser radiation used for the interferometry. In this case, according to the invention, the laser radiation can be generated in a longitudinally monomodal manner having a defined emission wavelength and having a coherence length of at least 10 m by means of a laser diode.

In principle, laser radiation having a comparatively large coherence length is required or preferable for interferometric applications, since the achievable precision and measurement range of the measuring device is significantly dependent on this coherence length. Gas lasers, for example, HeNe lasers, are typically used as radiation sources for generating such laser radiation having large coherence length for presently known measurement methods, in particular with respect to the application in laser trackers. Such laser radiation, which fulfills the required specifications, can also be generated according to the invention by a specifically implemented laser diode.

With respect to the structural embodiment in the scope of the method, a measuring device for executing the method can be implemented according to the invention, wherein the measuring device can be embodied by a laser tracker or a geodetic surveying device, for example, a total station.

In the scope of the invention, the method can accordingly be executed using a measuring device having an interferometer unit, in particular wherein the measuring device is implemented as a laser tracker for progressively tracking the target and for determining the position of the target. The laser tracker has in this case a radiation source for generating laser radiation and a beam splitter for splitting the laser radiation into at least the reference radiation and the measurement radiation and a base which defines a standing axis. Furthermore, the tracker has a beam deflection unit for emitting the measurement radiation and for receiving the measurement radiation reflected on the target, wherein the beam deflection unit is pivotable by a motor about the standing axis and an inclination axis, which is essentially orthogonal to the standing axis, in relation to the base, a distance measuring unit for determining a distance change to the target and an angle measuring functionality for determining an alignment of the beam deflection unit in relation to the base.

The invention therefore additionally relates to a measuring device for determining a distance change to a reflective target by means of interferometry having an emission unit for emitting measurement radiation, a reception unit for receiving at least a part of the measurement radiation reflected on the target, and a superposition component for generating a superposition of the reflected measurement radiation with a reference radiation.

In addition, a photosensitive detector for progressively detecting the superposition and an analysis unit for deriving an interferometer output variable based at least on the detected superposition are provided, wherein the interferometer output variable is dependent on a distance to the target, for generating a time-resolved output variable curve from the derived interferometer output variable, and for ascertaining the distance change based on the output variable curve.

Furthermore, the analysis unit is implemented for the progressive checking of the output variable curve performed in that, based on the output variable curve, at least one movement parameter for a relative movement of the target executable in the direction of the measurement radiation is progressively derived, a progressive comparison of the movement parameter to a defined movement criterion of the target is performed, wherein the movement criterion specifies a relative movement of the target in the direction of the measurement radiation, which relative movement is assumed to be really executable, practically plausible, and empirical, and an item of information is provided if the movement criterion is not fulfilled.

According to the invention, the analysis unit can be implemented to execute an above-described method according to the invention.

The measuring device can have an FPGA (field programmable gate array) for executing a pulse readout and for executing the method according to the invention, which is programmed such that an analysis of the intensities detected by the interferometer detector can be performed. A detected signal can be analyzed and further processed by means of digital signal processing. The progressively detected signal can thus be converted into individually countable pulses, so that these pulses can be detected.

In addition, the FPGA can be programmed to recognize missing pulses, wherein a comparison of movement parameters to movement criteria is performed according to the above-described method.

In particular, the FPGA can be programmed such that signal processing is executable to reconstruct an expected signal, in particular of the output variable curve, from a detected signal. For example, such a reconstruction can be performed to identify a signal pattern if the received signal has strong noise. Methods of signal processing, for example, a Fourier transform or specific filter methods, can be programmed for this purpose.

In addition, an adaptation of a checked measurement can be performed by the FPGA, so that, for example, an additional interferometer pulse is modeled in a detected output variable curve or an interferometer pulse is eliminated and a corrected measured value determination is performed in consideration of this additional pulse.

The measuring device can especially be implemented as a laser tracker for progressively tracking the target and for determining the position of the target, having the emission unit implemented as a radiation source for generating laser radiation and a beam splitter for splitting the laser radiation into at least the reference radiation and the measurement radiation and a base which defines a standing axis. In addition, the laser tracker has a beam deflection unit for emitting the measurement radiation and for receiving the measurement radiation reflected on the target, wherein the beam deflection unit is pivotable by a motor about the standing axis and an inclination axis, which is essentially orthogonal to the standing axis, in relation to the base, an interferometer unit for determining the distance change to the target, and an angle measuring functionality for determining an alignment of the beam deflection unit in relation to the base.

With respect to possible structural embodiments of the measuring device according to the invention, the device implemented as a laser tracker can have a support, which is pivotable by a motor about the standing axis in relation to the base and defines the inclination axis or a horizontal or recumbent axis, and a targeting unit, which is implemented as a beam deflection unit and is pivotable by a motor about the inclination axis in relation to the support, wherein the targeting unit has a telescope unit for emitting the measurement radiation and for receiving at least a part of the measurement radiation reflected on the target. In such an embodiment, an alignment of the measurement axis can be performed by means of an alignment of the targeting unit and the target search camera and the overview camera (OVC=overview camera) can be arranged on the targeting unit.

The invention additionally relates to a computer program product, which is stored on a machine-readable carrier, for executing the progressive checking by deriving the movement parameter, by comparing the movement parameter to the movement criterion, and by providing the item of information, in particular for executing the generation of the output variable curve and the ascertainment of the distance change, of the method according to the invention, in particular when the computer program product is executed on an analysis unit of a measuring device according to the invention.

BRIEF DESCRIPTION OF THE DRAWINGS

The method according to the invention and the device according to the invention will be described in greater detail hereafter solely by way of example on the basis of concrete exemplary embodiments which are schematically illustrated in the drawings, wherein further advantages of the invention will also be discussed. In the specific figures.

DETAILED DESCRIPTION

Figure 1:
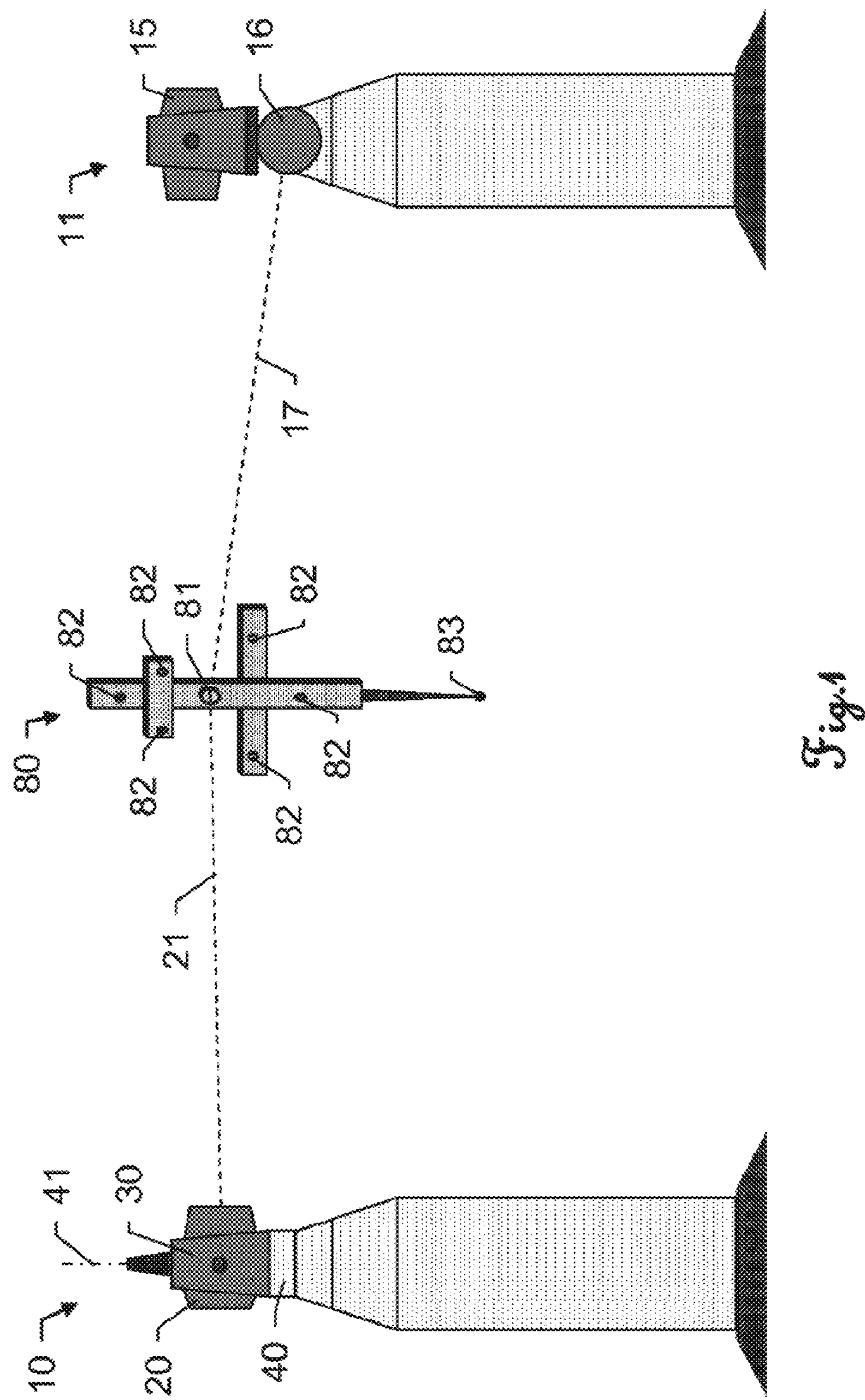
FIG. 1 shows two embodiments of a laser tracker according to the invention and a measuring aid instrument.

FIG. 1 shows two embodiments of laser trackers 10, 11 according to the invention and a measuring aid instrument 80, for example, a tactile measuring device. The first laser tracker 10 has a base 40 and a support 30, wherein the support 30 is arranged so it is pivotable or rotatable in relation to the base 40 about a pivot axis 41, which is defined by the base 40. In addition, a targeting unit 20 is arranged on the support 30 such that the targeting unit 20 is pivotable in relation to the support 30 about an inclination axis (transit axis). By way of an alignment capability of the targeting unit 20 thus provided about two axes, a laser beam 21 emitted by this unit 20 can be aligned exactly and therefore targets can be targeted. This alignment can take place automatically by means of a motorization. The pivot axis 41 and the inclination axis are arranged essentially orthogonally to one another in this case, i.e., slight deviations from an exact axis orthogonality can be predetermined and stored in the system, for example, to compensate for measurement errors thus resulting.

In the embodiment shown, the measurement laser beam 21 is oriented on a reflector 81 (retroreflector) on the measuring aid instrument 80 and is retroreflected thereon back to the laser tracker 10. By means of this measurement laser beam 21, a distance to the reflector 81 can be determined, in particular by means of runtime measurement, by means of the phase measurement principle, or by means of the Fizeau principle. The laser tracker 10 has for this purpose a distance measuring unit (having interferometer and absolute distance meter) for determining this distance between the tracker 10 and the reflector 81 and angle meters, which make it possible to determine a position of the targeting unit 20, by means of which the laser beam 21 can be aligned and guided in a defined manner, and therefore a propagation direction of the laser beam 21.

In addition, the laser tracker 10, in particular the targeting unit 20, has an image detection unit for the purpose of determining a position of a sensor exposure on a sensor or in a detected image of a CMOS or is implemented in particular as a CCD camera or pixel sensor array camera. Such sensors permit a position-sensitive detection of detected exposure on the detector. Furthermore, the measuring aid instrument 80 has a tactile sensor, the contact point 83 of which can be brought into contact with a target object to be surveyed. While this contact exists between the scanning tool 80 and the target object, a position of the contact point 83 in space and therefore the coordinates of a point on the target object can be exactly determined. This determination is performed by means of a defined relative positioning of the contact point 83 with respect to the reflector 81 and with respect to orientation markings 82 arranged on the measuring aid instrument 80, which can be implemented as light-emitting diodes, for example. Alternatively, the orientation markings 82 can also be implemented such that they reflect the incident radiation in the event of illumination, for example, using radiation of a defined wavelength (for example, orientation markings 82 implemented as retroreflectors), in particular they display a specific lighting characteristic, or such that they have a defined pattern or color coding. Therefore, an orientation of the scanning tool 80 can be determined from the location or distribution of the orientation markings 82 in an image detected using the sensor of the image detection unit.

The second laser tracker 11 has a beam guiding unit 16 separate from the image detection unit 15 for emitting a second laser beam 17, which is also aligned on the reflector 81. Both the laser beam 17 and also the image detection unit 15 are respectively pivotable by a motor about two axes and can thus be aligned such that, by means of the image detection unit 15, the target 81 targeted using the laser beam 17 and the orientation markings 82 of the measuring aid instrument 80 can be detected. Therefore, a precise distance to the reflector 81 and an orientation of the instrument 80 can also be determined here on the basis of the spatial location of the orientation markings 82.

For the respective alignment of the laser beams 17, 21 on the reflector 81, respective illumination means for illuminating the reflector 81 with radiation of a specific wavelength, in particular in the infrared wavelength range, are provided on the laser trackers 10, 11, and additionally at least one target search camera having a position-sensitive detector, a so-called ATR camera (automatic target recognition), is arranged on each tracker 10, 11. The illumination radiation which is reflected on the reflector 81 and reflected back to the laser tracker 10, 11 can respectively be detected by means of the camera and a position of the reflector 81 on the respective detector can be imaged using the position-sensitive detectors. Therefore, both using the first laser tracker 10 and also using the second laser tracker 11, an imaged position of the reflector can be determined and, as a function of these detected search image positions, the target (reflector 81) can be located in the image and the targeting unit 20 or the beam guiding unit 16 can be aligned such that the target is automatically targeted using the measurement beam 17, 21 or the target 81 is automatically (iteratively) approached using the laser beam 17, 21. For a robust detection of the reflections, filters can be installed in the target search camera in particular (for example, wavelength-dependent filters), which, for example, only transmit the light emitted by the illumination means, and/or threshold values can be stored for a comparison of the detected signals to signal setpoint values in the laser tracker.

The laser trackers 10, 11 can alternatively each have at least two cameras each having a position-sensitive detector, wherein, for each tracker 10, 11, from the two search image positions detected in each case for the reflector 81, in each case a coarse position of the reflector 81 can be determined, for example, according to generally known principles of photogrammetry, for example. Such a system for finding targets is described, for example, in European patent application number 11192216.7.

In addition, the laser trackers 10, 11 according to the invention each have an overview camera, the field of vision of which—in comparison to the fields of vision of the target search cameras having position-sensitive detectors—is larger and therefore allows a larger range to be detected. Using these overview cameras, images of objects and targets in the visible light spectrum can be detected, wherein these images can be output by means of a display unit to the laser trackers and/or on a display screen, which is arranged on a respective control unit for controlling the respective laser tracker 10, 11. Color images can especially be detected using the overview camera.

The illumination means, the target search cameras, and/or the overview camera can be arranged in this context, for example, on the image detection unit 15, the beam guiding unit 16, the targeting unit 20, the support 30, and/or the base 40 in defined positions in each case.

The distance measuring unit of the respective laser tracker 10, 11 provides an item of distance information to the target 81 on the basis of a determination of a relative or absolute distance between the respective tracker 10, 11 and the target 81 and a determination of a change of this distance. If the absolute distance is determined in this case in particular by means of runtime measurement, by means of the phase measurement principle, or by means of the Fizeau principle, a measurement using an interferometer associated with the respective distance measuring unit is thus carried out to determine the distance change. For this purpose, a radiation source for generating laser radiation is provided on each of the laser trackers 10, 11, wherein the generated radiation is split at least into a reference radiation and a measurement radiation 17, 21. The reference radiation is guided along a known reference path (length of the path is known) to an interferometer detector. In an alternative embodiment, the length of the reference path can at least be constant, wherein the length of the path does not have to be known. The length of the reference path can be "zero" in particular in dependence on the arrangement and embodiment of the optical components (for example, detector). The measurement radiation 17, 21, in contrast, is emitted from the tracker 10, 11 such that it is incident on the target 81 and is reflected back thereon. The reflected beam or parts of the reflected beam are then in turn detected on the part of the tracker 10, 11 and also guided along a measurement path to the interferometer detector, where the reference radiation is superimposed with the received measurement radiation 17, 21. By way of this superposition, an interference results from the two types of radiation, which can be detected and resolved at the detector.

In the scope of this interference, maxima (constructive interference) and minima (destructive interference) of radiation intensity are generated. The intensity is in this case dependent on a beam path difference between the two beams incident on the detector. Since the reference path and therefore the distance which is covered by the reference radiation to the detector can be kept constant, the path difference is essentially dependent on the distance between the respective laser tracker 10, 11 and the target 81. Accordingly, if the distance is changed between the tracker 10, 11 and the target 81, the path difference thus also changes and therefore, during the distance change, also the intensity of a detected interference state as an interferometer output variable (interference pattern).

During such a relative movement (wherein the distance is changed) between at least one of the laser trackers 10, 11 and the target 81, high and low intensities can alternately be established at the interferometer detector. In consideration of the wavelength of the measurement radiation 17, 21 (and of the reference radiation), a relative distance, i.e., a change of the distance, to the target 81 can be calculated from a progressive detection of the interference state as an interferometer output variable. In particular, the detected intensity maxima and/or intensity minima are progressively counted (as interferometer pulses) in this case.

According to the invention, both the laser tracker 10 and also the laser tracker 11 have a checking functionality, wherein, upon the execution thereof, the interference curve detected by the detector is progressively read out and processed further as an output variable curve or intensity pattern. In this case, a movement parameter for a relative movement between the laser tracker and the target, which occurs radially along the measurement radiation, is derived from the detected interference curve, which is read out as an output variable curve. This parameter can therefore represent a relative movement, which is determined by a computer from the interferometer signal, between target 81 and trackers 10, 11, i.e., a distance change between target 81 and trackers 10, 11. For example, the movement parameter can specify a current acceleration or velocity of the target 81 or of the respective tracker 10, 11, which is determined from the signal.

In the scope of the checking functionality, a comparison of the parameter to a movement criterion follows the determination of the respective movement parameter. The movement criterion specifies in this context a really executable relative movement between the laser tracker and the target, i.e., relative movements between trackers 10, 11 and target 81, which can actually occur, are described by the respective movement criterion. For example, the criterion can provide acceleration values for the target 81 or the trackers 10, 11, which can really occur during a movement (of the target or tracker) executable, for example, by a user or a specified machine.

For example, if a current acceleration, i.e., a currently existing value for the acceleration of the target 81 or the tracker 10, 11, is determined in dependence on the interference curve as an output variable curve as the movement parameter, this value can be compared to a corresponding movement criterion, which has an upper limit for permissible accelerations, for example.

Thereafter, an item of information is output in dependence on the comparison of the movement parameter to the movement criterion, this item of information giving information about, for example, the plausibility or possible execution of the radial relative movement, which is derived by means of the interferometer signal. For example, if the upper limit for the acceleration is exceeded by the determined movement parameter, the measured value is thus considered to be unacceptable. The item of information can be provided graphically or acoustically, for example, by means of a display screen on the tracker, on a computer monitor, or by a mobile data logger.

If a movement parameter is classified as non-plausible by the comparison to a corresponding movement criterion, this is thus a clear indication that an error has occurred during the measurement using the interferometer. This can be the case, for example, if one or more interference maxima are not detected or are detected erroneously, or the readout of the detected maxima is erroneous. The item of information therefore provides information about the correctness of the measurement carried out or, in dependence on the comparison of the movement parameter to the movement criterion, a possible deviation of the calculated measured value from a possible movement value or from a movement value which is estimated or anticipated on the basis of the output variable curve can be specified.

In particular, the checking functionality is executed automatically during a measurement operation carried out by means of the interferometer.

In addition, an active correction of the measured values can be performed in the scope of the checking. Thus, for example, a measurement in which a distance change was determined in the case of missing interference pulses can be corrected so that the missing pulses are modeled and are taken into consideration for a renewed determination. On the other hand, an elimination of erroneous additionally detected pulses can be performed in this context.

Figure 2A:
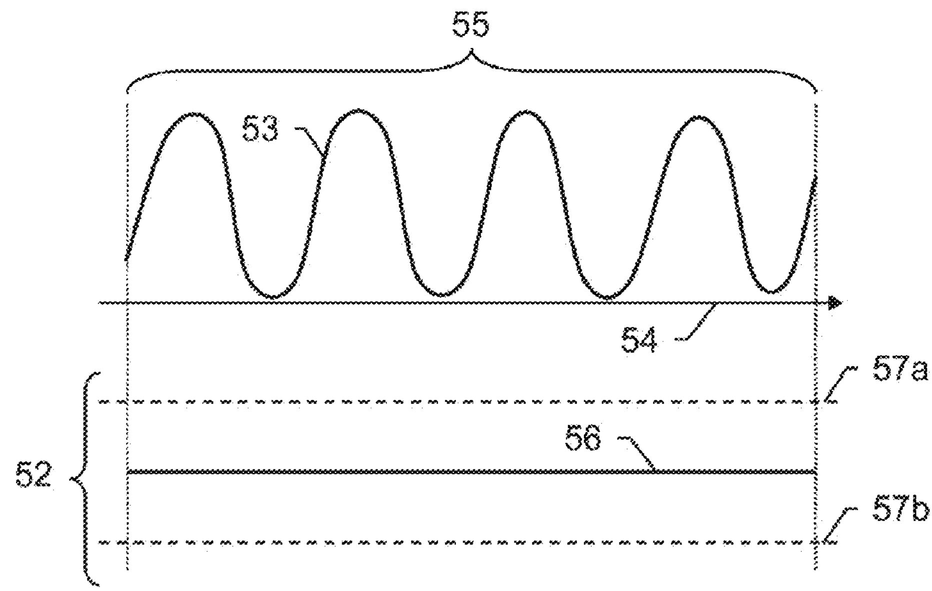
FIGS. 2*a-b* show the functional principle of a method according to the invention.
Figure 2B:
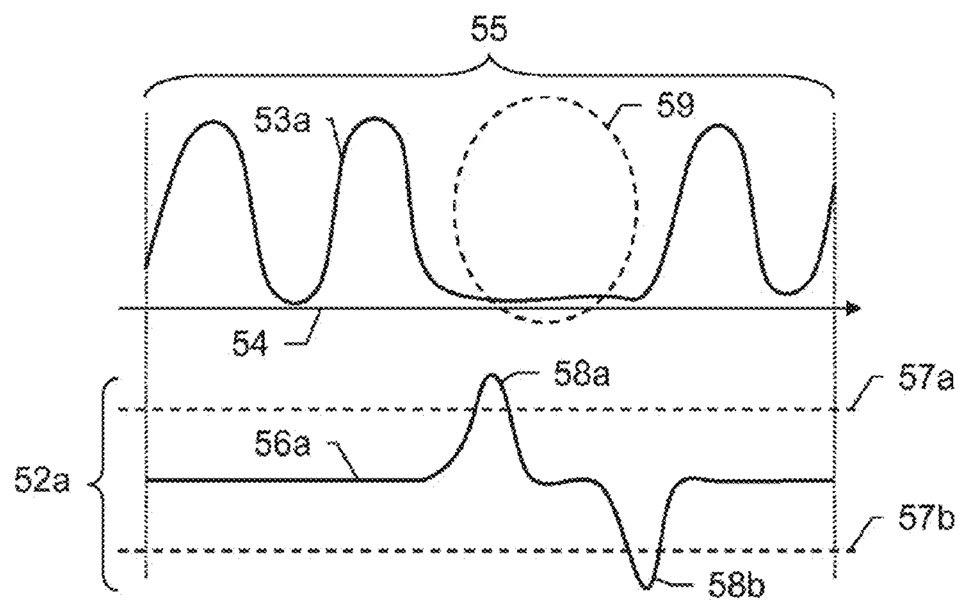

FIGS. 2*a* and 2*b* show the functional principle of a method according to the invention (checking method) on the basis in each case of an intensity curve 53, 53*a*, which is detected and read out by a detector of an interferometer, and in each case of a plausibility check 52, 52*a* progressively derived therefrom.

FIG. 2*a* shows an intensity, which is progressively detected by means of a detector, of radiation incident on the detector, wherein the intensity is detected in a time-resolved manner and is displayed using an intensity curve 53 which represents an output variable curve, i.e., respective measured intensities are assigned respective measuring points in time, wherein the intensities are shown plotted over a time axis 54. A distance change which occurred during the time interval 55, in particular in the radial direction to the measurement radiation, can be derived from the number of the intensity maxima detected in the time interval 55 shown, if the wavelength of the measurement radiation is known. An interference curve, which is shown here as an output variable curve, represents a substantially uniform, linear radial relative movement between a target and the detector of the interferometer, in particular a uniform movement of the target in relation to a laser tracker equipped with the interferometer. A uniform decrease or increase of the distance between the tracker and the target targeted using the measurement radiation can be concluded from the sequence shown of large and small intensities and the chronologically homogeneous sequence thereof (uniform frequency of the curve 53).

To check for the correctness or possible errors of the measurement of the distance change, a checking curve 56, which is time-resolved over the time interval 55, is derived from the intensity curve 53. The checking curve 56 represents for this purpose the time curve of the movement parameter, which is derived from the interference curve (output variable curve), for the relative movement, i.e., the checking curve 56 corresponds to the movement parameters plotted over the time. The derivation of movement parameters which are chronologically assigned to the intensity curve 53 is performed progressively for this purpose. The checking curve 56 is, in the example shown, a curve having a slope of "zero", i.e., the curve 56 indicates, for example, that the detected relative movement during the time interval 55 occurs with a constant velocity or unaccelerated. Furthermore, the relative velocity for the movement can be determined from the frequency of the intensity curve 53.

To check whether the determined movement parameters, from which the checking curve 56 is derived, are in each case plausible, possible, and practically acceptable values, i.e., values which come into consideration for a real relative movement, a movement criterion usable for this purpose—an upper limit 57*a* and a lower limit 57*b* here—is additionally defined for the plotted movement parameter. The detected movement can be checked for its trustworthiness from a comparison of the curve of the curve 56 or of the movement parameters to the respective defined limits 57*a*, 57*b*. Since the curve 56 extends in its entirety within the limits 57*a*, 57*b*, the measurement of the distance change represented by the intensity curve 53 is evaluated as correct. The relative movement which can be determined therefrom by a computer therefore corresponds to a real possible relative movement.

FIG. 2*b* also shows an intensity, which is progressively detected by means of the interferometer detector, of radiation incident on the detector, wherein the intensity is detected in a time-resolved manner and is shown in an intensity curve 53*a*.

In contrast to FIG. 2*a*, the intensity curve 53*a* does not show a uniform frequency with respect to the sequence of intensity maxima and minima. In the case of the detection of only the first two intensity peaks, which are comparatively homogeneous to one another, a uniform radial relative movement can be derived. However, these two first peaks are followed by a region 59 in which a further peak would be suspected to be or in the case of a further uniform relative movement would have to be detected. If a measurement of distance changes was now performed solely based on the countable interferometer pulses (intensity maxima), the distance change determined therefrom would thus be erroneous.

By executing the checking functionality, however, a checking curve 56*a* is also derived for the intensity curve 53*a* in the scope of the plausibility check 52*a*. The interference curve as the output variable curve is analyzed in this context with regard to a relative movement pattern, whereby two peaks 58*a* and 58*b* result in the curve of the checking curve 56*a*. Since the checking curve 56*a* in turn represents a movement parameter which is progressively derived from the intensity curve 53*a*, the peaks 58*a*, 58*b* each indicate an abrupt and strong change of the parameter value.

Since a relative acceleration is used as a movement parameter in the example shown, a comparatively large, positive acceleration is indicated by the peak 58*a* and an acceleration which is also comparatively large, but is negative (deceleration) is indicated by the peak 58*b*. The tips of the peaks 58*a*, 58*b* significantly exceed in this case the limits 57*a*, 57*b* defined for the acceleration parameter. In the scope of a comparison of the progressively derived movement parameter (acceleration value) to the movement criterion represented by the limits 57*a*, 57*b*, the plausibility of the possible movement of the target and/or of the tracker which is derivable from the intensity curve 53*a* is therefore rejected. Such a strong acceleration and subsequent strong deceleration of the target and/or of the tracker is not possible, in particular within the time interval 55, with respect to an actual movement executable using the target, for example. Such a movement would contradict the physical principle of mass inertia.

Furthermore, a number of pulses (peaks), which were not recognized or counted during the progressive detection of the interferometer output variable, can be established using the comparison of the movement parameter to the movement criterion. This establishment can be performed in particular by means of an analysis of the derived checking curve 56*a*. On this basis, the corresponding number of missing pulses can be incorporated into the intensity curve 53*a* and a renewed determination of the distance change can be carried out in dependence on this curve thus modified. As a result, a corrected value is then determined and provided for the distance change. In particular, the provision of this adapted value can be performed together with an item of information characterizing the adaptation. A coherent pulse sequence can especially be incorporated into the intensity curve 53*a*, wherein the sequence to be incorporated can be determined by means of an analysis using a Kalman filter.

In particular, an adaptation of the intensity curve 53*a* is performed such that a movement parameter derivable from the curve 53*a* or a checking curve 56*a* derivable therefrom fulfills the movement criterion or the new checking curve extends within the existing limits 57*a*, 57*b*.

In the example shown according to FIG. 2*b*, in the scope of the adaptation, a single additional peak can be incorporated in the region 59 (cf. intensity curve according to FIG. 2*a*) and a determination of a distance change can then be performed in consideration of the additional peak, so that the ascertained distance change corresponds to a correct measured value.

Figure 3:
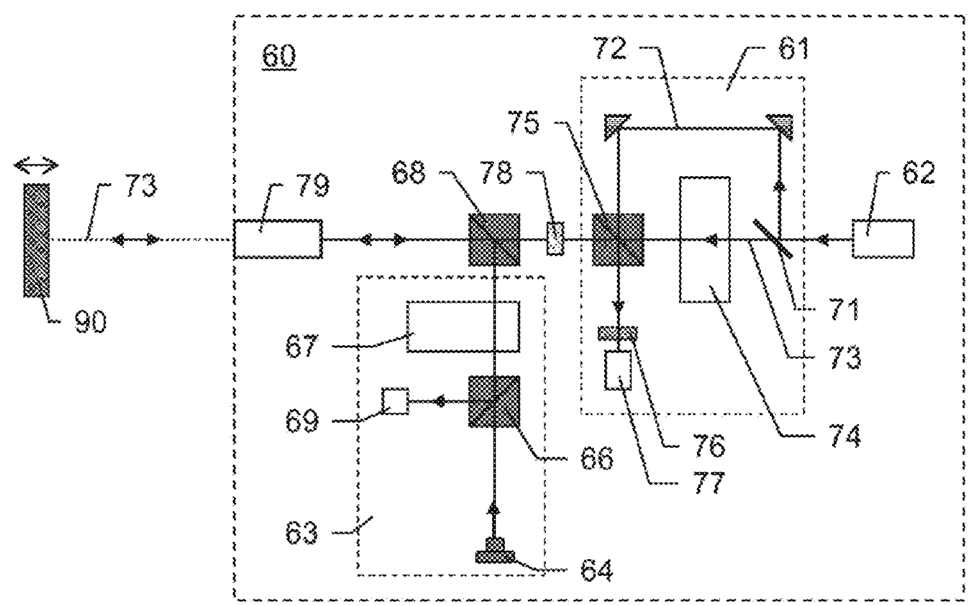
FIG. 3 shows an embodiment of an optical construction for a measuring device according to the invention having functionality for checking measurements of distance changes using an interferometer.

FIG. 3 shows an embodiment of an optical construction 60 for a measuring device according to the invention, in particular a laser tracker, with a functionality according to the invention for checking measurements of distance changes, which are executed using an interferometer 61. In addition, the construction 60 has a radiation source 62, for example, a HeNe laser radiation source or a laser diode, and an absolute distance meter 63 (ADM) having a further radiation source 64, for example, a laser diode or an SLED (super luminescent LED).

The light beam originating from the radiation source 64 of the absolute distance meter 63 is guided onto a polarizing beam splitter 66 and therefrom through an electro-optical modulator 67 to a wavelength-dependent beam splitter 68. Such a beam splitter 68 having wavelength-dependant beam splitting is used in particular in the case of different emission wavelengths of the two light sources 62, 64. The returning light is guided in the absolute distance meter 63 through the polarizing beam splitter 66 onto an ADM detector 69. In particular in this context, other ADM arrangements and methods are also usable, in which the measurement light beam may be coupled in and out through the wavelength-dependent beam splitter 68, for example. An example of such a distance meter is disclosed in WO 03/062744 A1. Other types of ADM, for example, phase meters, are also usable in principle here, as in the other embodiments of the invention.

The interferometer 61 uses, according to the invention, light which is generated by the radiation source 62. In the embodiment shown, this source 62 is directly assigned to the construction 60, wherein this source generates a longitudinal monomodal laser radiation having large coherence length (single frequency). In an alternative embodiment, the radiation source 62 can be assigned to another component of the measuring device, wherein the radiation is coupled by means of an optical waveguide into the interferometer 61. The generated laser radiation is split by a beam splitter 71 into a reference radiation 72 on a reference light path and into a measurement radiation 73 on a measurement light path. The measurement light path leads through an acousto-optical modulator 74 and is incident together with the reference light path on a polarizing beam splitter 75. The polarizing beam splitter 75 relays the measurement radiation to the wavelength-dependent beam splitter 68, and guides the returning measurement light together with the reference light via a polarization filter 76 to an interferometer detector 77. The mode of operation of such an interferometer 61 is known in principle and is based on the wave interference principle. Other interferometer arrangements and methods are also usable in particular, in which the measurement radiation may be coupled in and out through the wavelength-dependent beam splitter 68, for example. An example of such an interferometer is disclosed in WO 03/062744 A1. In other embodiments of the invention, other types of interferometers (for example, Michelson with quadrature detection) are also usable in principle.

A superposition of the reference radiation 72 with the measurement radiation 73, which is reflected on a movable target 90 and is guided onto the interferometer detector 77, is detected at the interferometer detector 77. In this case, the intensity of the interference arising upon the superposition of the two radiations 72, 73 can be detected progressively (as an interferometer output variable). The derivation of the interferometer output variable is based for this purpose at least on the detected superposition, wherein the interferometer output variable is dependent on a distance to the target.

If the target 90 is located at a constant distance to the optical construction 60 or to the interferometer detector 77, the intensity value measured during the maintained fixed distance to the target 90 is thus constant. With a relative movement of the target 90 to the optical structure 60 (or with a movement of the structure 60) in relation to an optical axis which is defined by the measurement radiation 73, the distance between the two components 90, 60 changes, and therefore a path difference between the reference radiation 72 and the measurement radiation 73 changes, and thus the intensity measurable at the interferometer detector 77 changes in dependence on the distance change. By means of the interferometer detector 77, these intensity variations can be measured and detected (as an output variable curve), in particular in a time-resolved manner, and read out and further processed for checking the correctness of such a distance change measurement. The generation of the time-resolved output variable curve is performed from the derived interferometer output variable, wherein an ascertainment of the distance change is performed based on the output variable curve.

To check the correctness of such a measurement—according to the procedure described in conjunction with FIGS. 1-2*b*—a movement parameter is progressively derived from the intensities detected using the interferometer detector 77 and this parameter is progressively compared to a movement criterion. An item of information with regard to the reliability of the measurement carried out is then output in dependence on the comparison.

The optical construction 60 furthermore has a quarter-wave plate 78 and a component 79, which separate light, which is incident along an optical axis used jointly by the absolute distance meter 63 and the interferometer from the outside into the construction 60, and coupled out a first part of this light to an overview camera (not shown) and a second part to a position converter (not shown). The overview camera can have separate optics and additionally an image converter. The overview camera typically has in this case an aperture angle of approximately 10° and a focal length of, for example, 30-50 mm and is used for the course localization of measurement targets.

To detect reflective targets, the construction 60 can additionally preferably have a reflector illumination having a specific illumination wavelength, which illuminates an angle range, which is preferably at least as great as the aperture angle of the overview camera.

Analysis electronics and/or analysis software of the overview camera then detects, for example, one or more bright light spots in the field of vision of the overview camera, which each correspond to a reflective target. The position thereof in the image of the overview camera can be ascertained therefrom, and a change of the alignment of the target, for example, of a measuring aid instrument (for example, scanner), can in turn be ascertained therefrom, whereby the measuring device or the optical construction 60 and the light beams of the distance meter or meters 61, 63 can be aligned on the target. Automatic target detection and a "lock-on", i.e., a progressive tracking of the target, of the distance meters 61, 63 on a target are therefore implementable.

The light fraction for the position converter is typically a beam bundle of returning light, which was preferably emitted from one of the distance meters 61, 63, preferably from the interferometer arrangement 61. The position converter can have separate optics and, for example, a position-sensitive detector (tracking surface sensor, in particular PSD or CCD), wherein measurement laser radiation reflected on the target can be detected thereon.

A surface sensor, which operates in a locally analog manner, and using which a focal point of a light distribution on the sensor surface can be determined, is to be understood as a PSD in this context. The output signal of the sensor is generated in this case by means of one or more photosensitive surfaces and is dependent on the respective position of the light focal point. The output signal can be analyzed and the focal point can be ascertained by means of downstream or integrated electronics. The ascertainment of the position of the focal point of the incident light spot can be performed very rapidly in this case (nanosecond range) and with a sub-nanometer resolution.

By means of this PSD, a deviation of the point of incidence of the detected beam from a servo-control zero point can be determined and tracking of the laser beam on the target can be performed based on the deviation. For this purpose and to achieve a high precision, the field of vision of this PSD is selected to be comparatively small, i.e., corresponding to the beam diameter of the measurement laser beam. A detection using the PSD occurs coaxially to the measurement axis, so that the detection direction of the PSD corresponds to the measurement direction. The application of the PSD-based tracking and the fine targeting can first be performed after the measurement laser has been aligned on a retroreflective target (at least coarsely, i.e., such that the target lies within the measurement laser cone).

Figure 4:
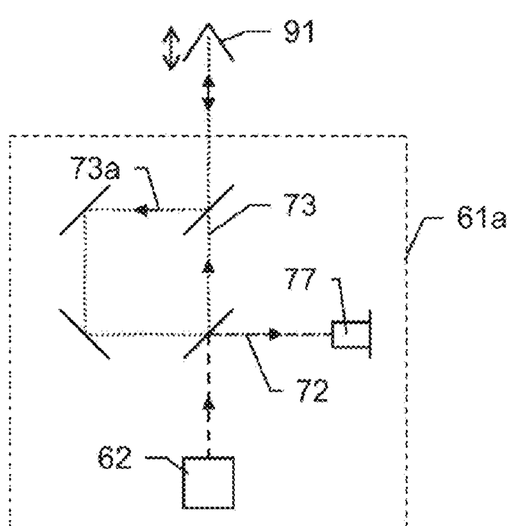
FIG. 4 shows a schematic construction of an interferometer arrangement for a measuring device having checking functionality according to the invention.

FIG. 4 shows a schematic construction of an interferometer arrangement 61*a* having a target 91 for a measuring device, in particular for a laser tracker, wherein a checking functionality according to the invention is provided for checking measurement results. By means of the radiation source 62, which is implemented, for example, as a laser diode or gas laser source having in each case large coherence length, a (longitudinal) monomodal measurement radiation having a coherence length of at least 10 m, preferably at least 50 m, is generated, which is guided using beam splitters, on the one hand, onto a reference path as reference radiation 72 and, on the other hand, onto a measurement path as measurement radiation 73. The measurement radiation 73 is directed onto the retroreflective target 91 and reflected back there to the interferometer construction 61*a*. The target 91 represents a movable target 91 in this case, wherein a distance change to the interferometer can be established and measured by means of the interferometer detector 77. For this purpose, the reference radiation and the reflected measurement radiation 73*a* are superimposed on the interferometer detector 77, whereby these beams interfere and generate an interference curve as an output variable curve in a time-resolved manner, which can be read out by means of the interferometer detector 77. Such an embodiment can be considered to be a (classical) homodyne interferometer. In a special embodiment, the determination of the distance change for this purpose can be performed by means of quadrature detection, wherein then, in addition to the distance change, a direction for the distance change can be unambiguously determined.

If a movement of the target 91 occurs in relation to the interferometer arrangement 61*a* such that at least a distance between the target 91 and the construction 61*a* is changed, a change of the interference curve (output variable curve) can be detected by means of the detector 77. In this case, an alternating sequence of intensity maxima and intensity minima generated by the interference can be detected. In this context, so-called interferometer pulses, i.e., detected maxima and/or minima, can be read out and progressively counted, so that a distance change between target 91 and interferometer construction 61*a* can be determined on the basis of a determined number of pulses.

During such a measurement with the interferometer 61*a*, according to the invention, a checking method for checking the measurement with respect to any possibly occurring measurement errors is applied. For this purpose, firstly a time-resolved interference curve, which is provided by way of the progressive detection of the intensity state, is analyzed such that a movement parameter for a recognized relative movement between target 91 and interferometer 61*a* is derived progressively. This parameter represents a relative movement variable, for example, relative velocity or relative acceleration, of the target 91 or the interferometer 61*a*.

The progressively derived movement parameter is then progressively compared to a respective criterion for the movement variable determined in each case. By means of the criterion, the movement variable is defined in this case such that a differentiation can be carried out between movements of the target 91 and/or the interferometer 61*a*, which are possible to execute and which are impossible to execute, on the basis of this variable. For example, in the scope of the criterion, a range for realistically occurring relative accelerations (acceleration as a movement variable) and a range for accelerations which are sufficiently large that, for example, an acceleration of the target 91 is not conceivable or cannot be carried out under applicable physical conditions, are defined.

In dependence on the comparison, an item of information with respect to the correctness or the plausibility of the performed measurement is generated and provided, which is output, for example, acoustically or graphically in a visual manner, in particular for a user.

An estimated value for the trustworthiness of the measurement which was carried out can especially be provided in dependence on the comparison, wherein this estimated value is derived, for example, on the basis of a compensation calculation for the relative movement represented by the interference curve.

In an alternative embodiment (not shown here), the interferometer can be embodied as a heterodyne interferometer (for example, heterodyne Michelson interferometer), wherein the determination of the distance change can be performed by means of this interferometer and in addition a check of the output variable curve can be performed. In this case, radiation which differs slightly with respect to the wavelength is used in the two arms of the interferometer (measurement path and reference path). After the measurement radiation having a first wavelength $\lambda_0$ was reflected at a target back to the interferometer and the reference radiation having a second wavelength $\lambda_1$ has passed through the reference path, a measurement superposition (beat state), which can be detected using a measurement detector, therefore results when the beams are brought together. In addition, a time-resolved beat curve can be detected by a progressive detection of the measurement superposition (beat state). At least one of the radiations (measurement radiation or reference radiation) can be generated in this case, for example, using an acousto-optical modulator, in particular by a specific modulation frequency (for example, 80 MHz), wherein an electronically generated reference variable can be generated in dependence on an operating parameter (for example, the modulation frequency) of the modulator. Alternatively or additionally, a part of the radiation (of both wavelengths) can be coupled out and detected without reflection at the target at a reference detector as a reference superposition.

Based on the measurement superposition detected using the measurement detector and the electronic reference variable, a phase relation comparison can be performed in dependence on the measurement superposition and the reference variable. In addition, a comparison of the phase relation between the measurement superposition (beat at the measurement detector) and the reference superposition (beat at the reference detector) can be performed based on the radiations detected using the two detectors (measurement detector and reference detector). Such a comparison based on the electronic reference variable or the reference superposition is understood in the scope of the invention as an interferometer output variable. A phase relation curve can be generated as a time-resolved output variable curve and a distance change to the target can be determined from a progressive detection of this comparison.

For this purpose, for example, lasers using the Zeeman effect (for example, multifrequency lasers) or acousto-optical modulators can be used to generate the radiations having different wavelengths.

In the scope of the method according to the invention for determining the distance change by means of the heterodyne interferometer, the interferometer output variable is to be understood in this case as a comparison of the phase relation between the beat at the measurement detector (measurement superposition) and the beat at the reference detector (reference superposition) and the output variable curve is to be understood as a progressively detected such comparison.

In conjunction with a further, alternative embodiment, the interferometer output variable can be understood as a beat state defined by the superposition of the measurement radiation and the reference radiation having different wavelengths and the output variable curve can be understood as a progressively detected beat state (beat curve).

Figure 5:
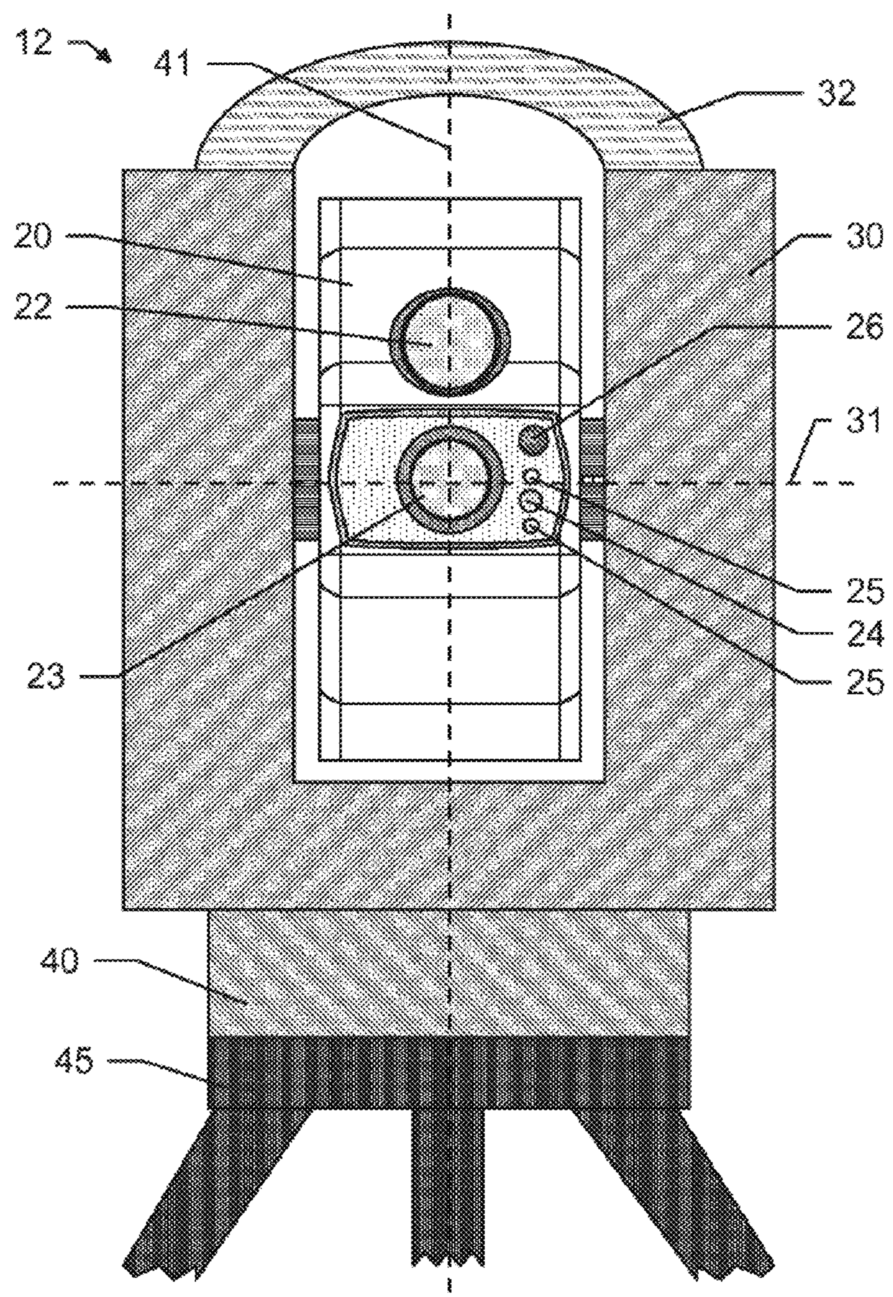
FIG. 5 shows a further embodiment of a laser tracker having checking functionality according to the invention.

FIG. 5 shows a further embodiment of a laser tracker having checking functionality according to the invention and having a base 40, which is arranged on a tripod 45 and defines a pivot axis 41. In addition, a support 30, which defines an inclination axis 31 (tilt axis) and is pivotable about the pivot axis 41 in relation to the base 40, having a handle 32 is arranged on the base. Furthermore, a targeting unit 20 is provided, wherein this targeting unit 20 is pivotable about the inclination axis 31 in relation to the support 30.

The targeting unit 20 furthermore has a vario-camera having a vario-camera objective 22 and an optic 23, which is assigned to a distance measurement and tracking unit arranged in the targeting unit 20, wherein, by means of the optic 23, a measurement laser beam is emitted from the distance measurement and tracking unit for precisely determining a distance to a target and for tracking the target. In addition, a target search camera 24 having a camera optic and having a position-sensitive detector and additionally having illumination means 25, which are implemented as LEDs, for example, and emit light in the infrared range in operation in particular, is provided on the targeting unit 20. Using these illumination means 25, a target, for example, a reflector, can be illuminated or irradiated and at least a part of the radiation can be reflected back by the reflector in the direction of the laser tracker 12 or in the direction of the target search camera 24. The reflected light is then detected using the camera 24, imaged by means of the camera optics on the position-sensitive detector, and the position of the imaging is identified in a search image as a search image position. In each case a direction to the target and therefore an offset in relation to a zero position on the respective detector and/or a direction angle for two detector axes, for example, for an X axis and a Y axis predefined by the dimensioning of the detector, can now be determined therefrom for each of these search image positions in consideration of the orientation of the detectors. Automated finding of the target can be performed by means of these positions of the target thus detected.

Furthermore, the laser tracker 12 has an overview camera 26, which is placed in a known position relationship to the target search camera 24. The field of vision of the overview camera 26 (overview field of vision) is implemented in this embodiment such that the field of vision of the target search camera 24 overlaps with the overview field of vision in a shared region, so that a target detectable using the target search camera 24 can also be detected using the overview camera 26, in particular simultaneously.

The distance measuring unit assigned to the targeting unit 20 has at least one interferometer for determining distance changes. Similarly to the checking procedure described in conjunction with FIG. 4 for measurements carried out using the interferometer, a checking functionality is executed on the tracker 12, wherein the detected output variable curve is analyzed and checked with respect to correctness, in particular wherein measurements evaluated as erroneous are reported.

It is obvious that these illustrated figures only schematically illustrate possible exemplary embodiments. The various approaches can also be combined, according to the invention, with one another and with interferometry methods for measuring distance changes, with methods for distance determination, and with measuring devices according to the species, in particular laser trackers, of the prior art.

What is claimed is:

1. A method for progressively determining a distance change to a movable and reflective target in an interferometric distance measurement, the method comprising:

emitting measurement radiation to the target, receiving of at least a part of the measurement radiation, which is reflected on the target, generating and detecting of a superposition of the reflected measurement radiation with a reference radiation, deriving of an interferometer output variable based at least on the detected superposition, wherein the interferometer output variable is dependent on a distance to the target, generating of a time-resolved output variable curve from the derived interferometer output variable, and ascertaining of the distance change based on the output variable curve, wherein a progressive checking of the output variable curve is performed in that based on the output variable curve, at least one movement parameter, which relates to the direction of the measurement radiation, of a relative movement of the target is progressively derived, a progressive comparison of the movement parameter to a defined movement criterion of the target is performed, wherein the movement criterion specifies a relative movement of the target in the direction of the measurement radiation, which relative movement is assumed to be really executable, practically plausible, and empirical, and an item of information on the plausibility of the distance change is provided if the movement criterion is not fulfilled.

2. The method as claimed in claim 1, wherein a correction of the ascertained distance change is carried out and/or a graphic or acoustic output is performed in dependence on the provision of the item of information.

3. The method as claimed in claim 2, wherein the correction is performed such that a movement parameter derivable after the correction fulfills the movement criterion, wherein an adaptation of the output variable curve is performed such that the movement parameter derived from the adapted output variable curve fulfills the movement criterion.

4. The method as claimed in claim 1, wherein, in the scope of the ascertainment of the distance change, interferometer pulses are identified and progressively counted from a sequence of constructive interference and destructive interference, wherein the distance change to the target is determined from a number of interferometer pulses determined in a defined time interval.

5. The method as claimed in claim 1, wherein a current relative velocity and/or current relative acceleration of the target in the direction of the measurement radiation is/are derived as a movement parameter from the output variable curve.

6. The method as claimed in claim 1, wherein an intensity curve is derived in dependence on the output variable curve, wherein the movement parameter is derived from an amplitude and/or a frequency of the intensity curve.

7. The method as claimed in claim 6, wherein the movement parameter is determined as a frequency change and/or amplitude change from the intensity curve.

8. The method as claimed in claim 1, wherein a tolerance range is determined for the movement parameter and the tolerance range is defined as the movement criterion, wherein the tolerance range is defined by at least one threshold value.

9. The method as claimed in claim 1, wherein a real relative velocity, which is assumed to be maximal, and/or a real relative acceleration, which is assumed to be maximal, of the target in the direction of the measurement radiation is/are used as a movement criterion, wherein the real relative velocity and/or the real relative acceleration is/are progressively measured and progressively set as a movement criterion.

10. The method as claimed in claim 1, wherein the measurement radiation is generated in a longitudinally monomodal manner having a defined emission wavelength and having a coherence length of at least 10 m by means of a laser diode.

11. The method as claimed in claim 1, wherein the method is executed using a measuring device having an interferometer unit, wherein the measuring device is implemented as a laser tracker for progressively tracking the target and for determining the position of the target, wherein the laser tracker comprises:

a radiation source for generating laser radiation and a beam splitter for splitting the laser radiation into at least the reference radiation and the measurement radiation, a base, which defines a standing axis, a beam deflection device that emits the measurement radiation and receives the measurement radiation reflected on the target, wherein the beam deflection unit is pivotable by a motor about the standing axis and an inclination axis, which is essentially orthogonal to the standing axis, in relation to the base, a distance measurement that determines a distance change to the target, and an angle measurement functionality for determining an alignment of the beam deflection unit in relation to the base.

12. A measuring device for progressively determining a distance change to a reflective target in an interferometric distance measurement, the measuring device comprising:

an emission unit that emits measurement radiation, a reception unit that receives at least a part of the measurement radiation reflected on the target, a photosensitive detector for progressively detecting a superposition component that is generated from a superposition of the reflected measurement radiation with a reference radiation and an analysis device that is programmed to:

derive an interferometer output variable based at least on the detected superposition, wherein the interferometer output variable is dependent on a distance to the target, generate a time-resolved output variable curve from the derived interferometer output variable, and ascertain the distance change based on the output variable curve, wherein the analysis unit is implemented for the progressive checking of the output variable curve performed in that based on the output variable curve, at least one movement parameter for a relative movement of the target executable in the direction of the measurement radiation is progressively derived, a progressive comparison of the movement parameter to a defined movement criterion of the target is performed, wherein the movement criterion specifies a relative movement of the target in the direction of the measurement radiation, which relative movement is assumed to be really executable, practically plausible, and empirical, and an item of information on the plausibility of the distance change is provided if the movement criterion is not fulfilled.

13. The measuring device as claimed in claim 12, wherein the measuring device is implemented as a laser tracker for progressively tracking the target and for determining the position of the target, having the emission unit, which is implemented as a radiation source, for generating laser radiation and a beam splitter for splitting the laser radiation into at least the reference radiation and the measurement radiation, a base, which defines a standing axis, an interferometer for determining the distance change to the target, and wherein the laser tracker has:

a support, which is pivotable by a motor about the standing axis in relation to the base and defines the inclination axis.

14. The measuring device as claimed in claim 12, wherein a correction of the ascertained distance change is carried out and/or a graphic or acoustic output is performed in dependence on the provision of the item of information.

15. The measuring device as claimed in claim 14, wherein the correction is performed such that a movement parameter derivable after the correction fulfills the movement criterion, wherein an adaptation of the output variable curve is performed such that the movement parameter derived from the adapted output variable curve fulfills the movement criterion.

16. The measuring device as claimed in claim 12, wherein, in the scope of the ascertainment of the distance change, interferometer pulses are identified and progressively counted from a sequence of constructive interference and destructive interference, wherein the distance change to the target is determined from a number of interferometer pulses determined in a defined time interval.

17. The measuring device as claimed in claim 12, wherein a current relative velocity and/or current relative acceleration of the target in the direction of the measurement radiation is/are derived as a movement parameter from the output variable curve.

18. The measuring device as claimed in claim 12, wherein an intensity curve is derived in dependence on the output variable curve, wherein the movement parameter is derived from an amplitude and/or a frequency of the intensity curve.

19. A tangible, non-transitory, computer program product, which is stored on a machine-readable carrier, for executing the method comprising:

emitting measurement radiation to the target, receiving of at least a part of the measurement radiation, which is reflected on the target, generating and detecting of a superposition of the reflected measurement radiation with a reference radiation, deriving of an interferometer output variable based at least on the detected superposition, wherein the interferometer output variable is dependent on a distance to the target, generating of a time-resolved output variable curve from the derived interferometer output variable, and ascertaining of the distance change based on the output variable curve, wherein a progressive checking of the output variable curve is performed in that based on the output variable curve, at least one movement parameter, which relates to the direction of the measurement radiation, of a relative movement of the target is progressively derived, a progressive comparison of the movement parameter to a defined movement criterion of the target is performed, wherein the movement criterion specifies a relative movement of the target in the direction of the measurement radiation, which relative movement is assumed to be really executable, practically plausible, and empirical, and an item of information on the plausibility of the distance change is provided if the movement criterion is not fulfilled.

* * * * *